United States Patent Office 2,892,319
Patented June 30, 1959

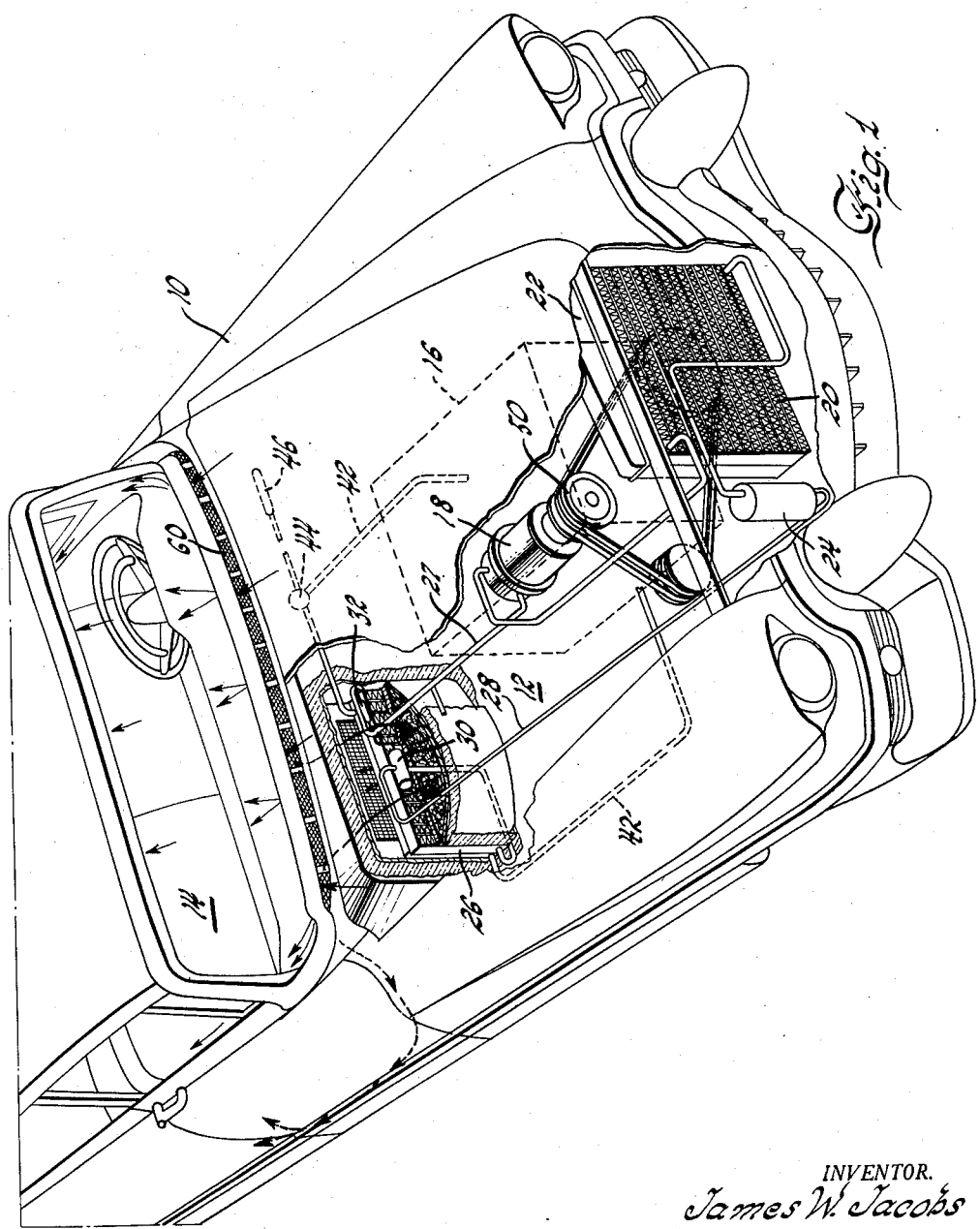
June 30, 1959   J. W. JACOBS   2,892,319
REFRIGERATING APPARATUS
Filed Oct. 20, 1955   5 Sheets-Sheet 1
INVENTOR.
James W. Jacobs
BY
R. R. Candor
HIS ATTORNEY June 30, 1959　　　J. W. JACOBS　　　2,892,319
REFRIGERATING APPARATUS
Filed Oct. 20, 1955　　　5 Sheets-Sheet 2
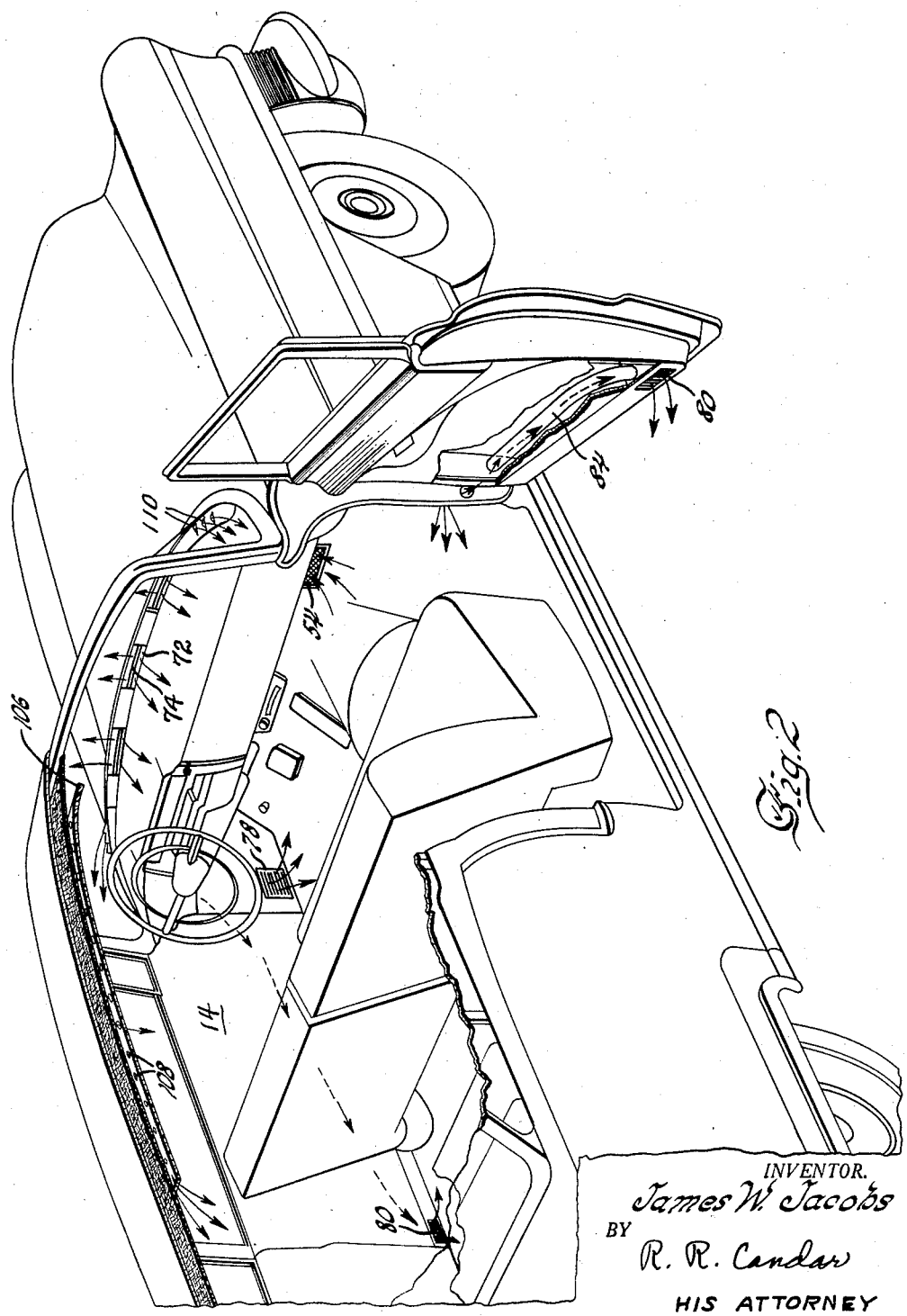
INVENTOR.
James W. Jacobs
BY R. R. Candar
HIS ATTORNEY

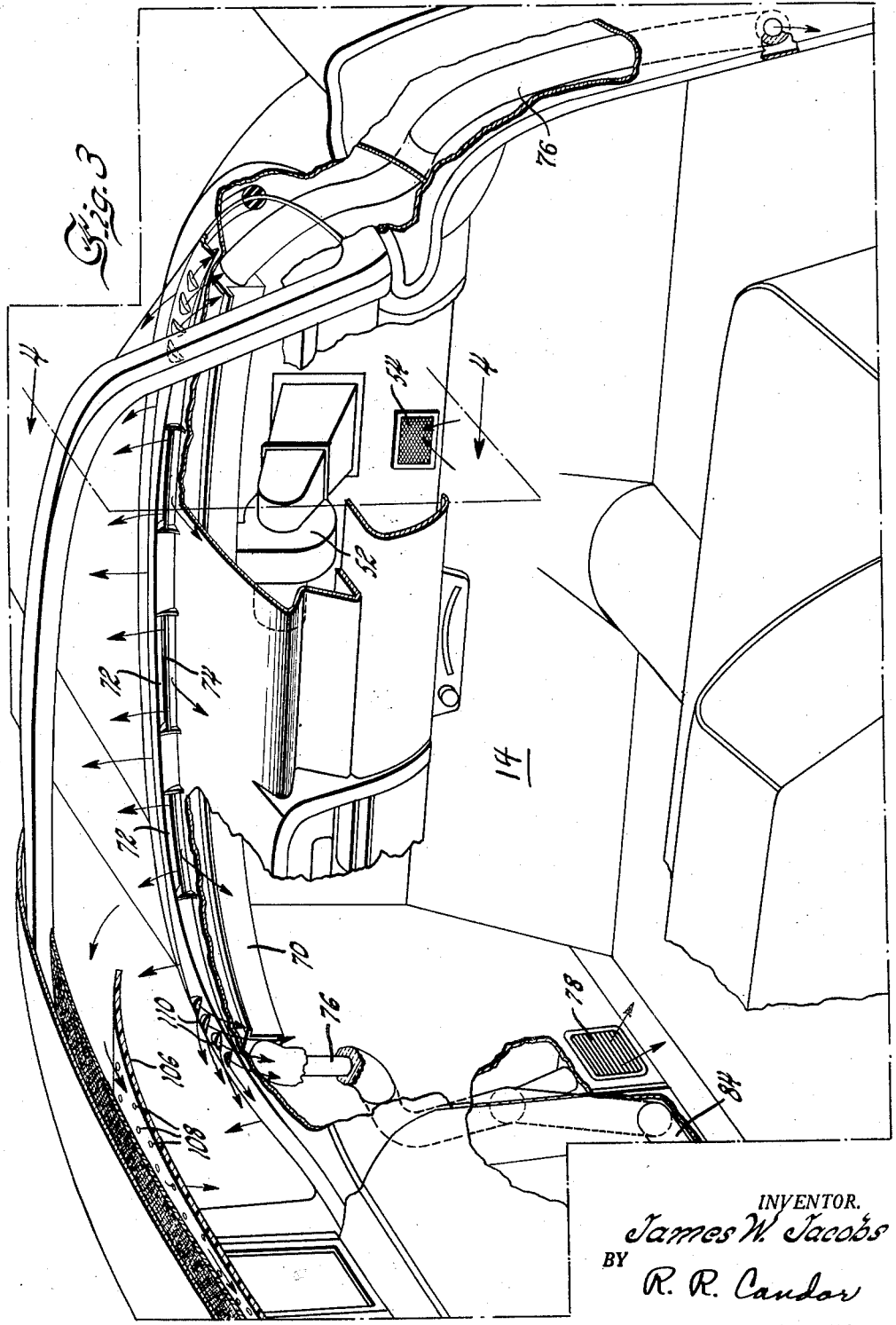

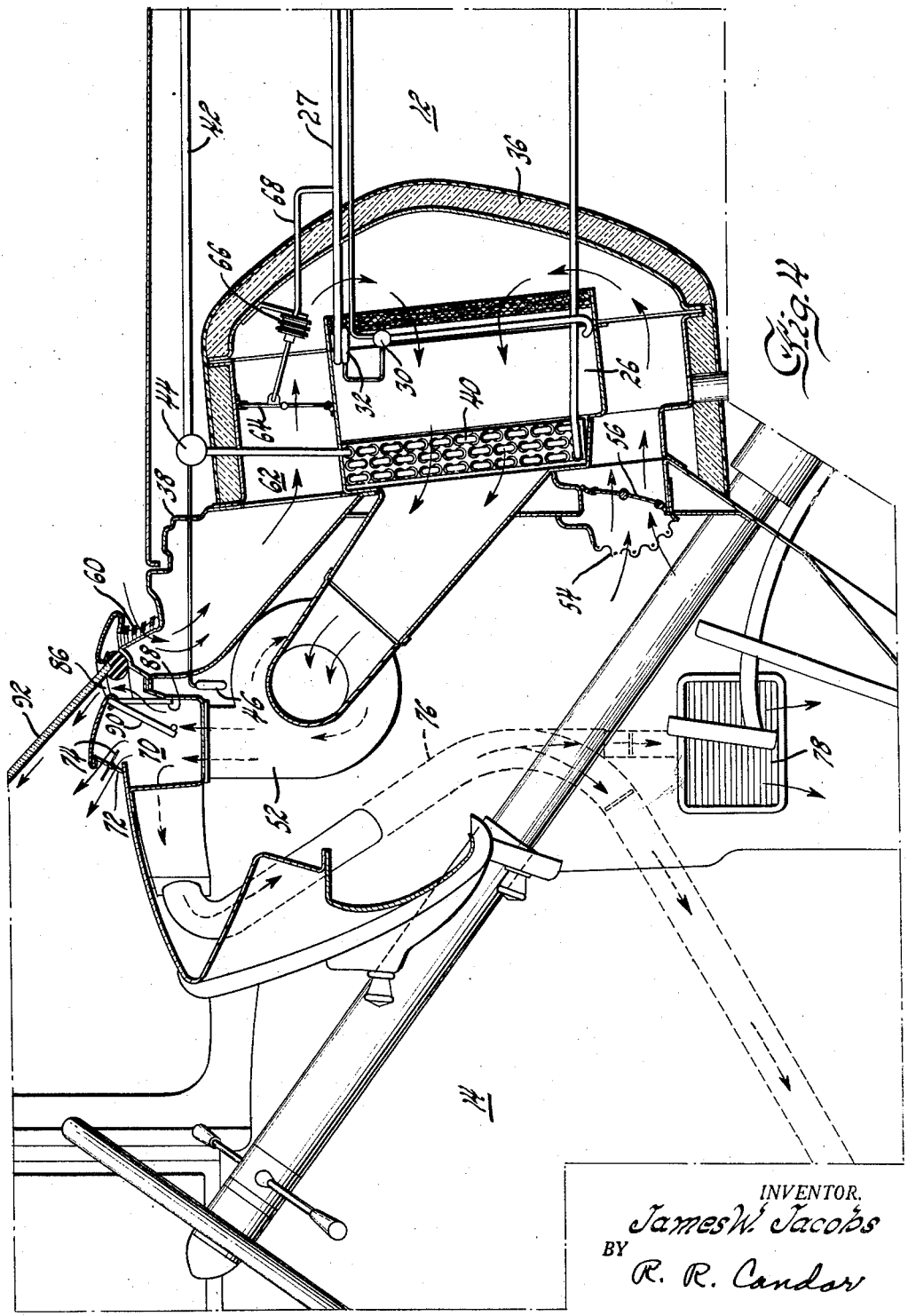

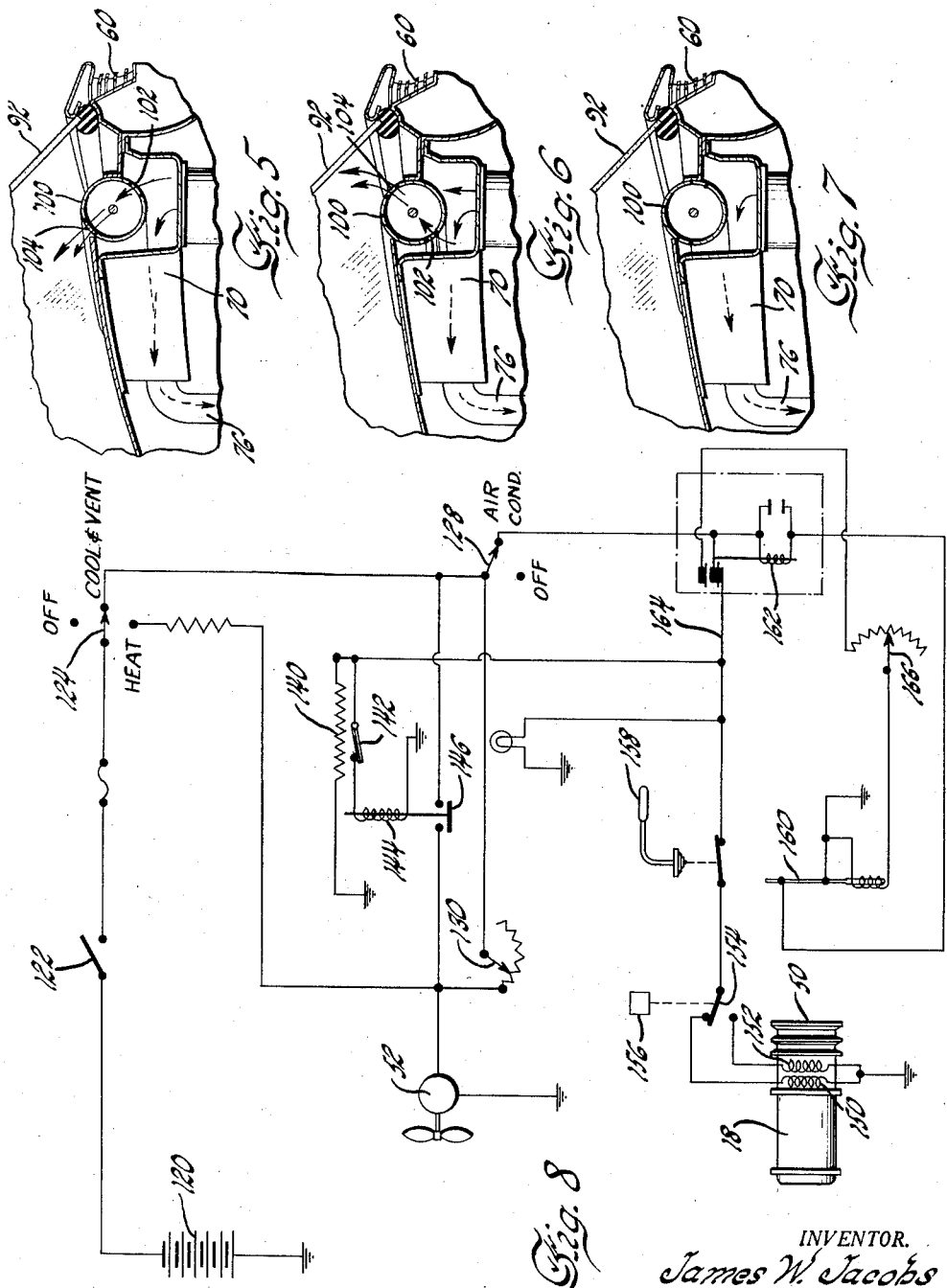

2,892,319

REFRIGERATING APPARATUS

James W. Jacobs, Dayton, Ohio, assignor to General Motors Corporation, Detroit, Mich., a corporation of Delaware Application October 20, 1955, Serial No. 541,753

9 Claims. (Cl. 62—186)

This invention relates to refrigerating apparatus and more particularly to an automobile air conditioning system.

It is an object of this invention to provide an automobile air conditioning system having improved means for controlling the temperature and the air distribution within the passenger compartment of an automobile.

Still another object of this invention is to provide improved means for controlling the speed of both the compressor and the air circulating fan.

A further object of this invention is to provide means for automatically increasing the ratio of fresh air to recirculated air flowing over the evaporator in response to the evaporator pressure so as to automatically introduce a larger quantity of fresh air whenever evaporator pressure approaches the value at which the condensate on the evaporator would tend to freeze.

Further objects and advantages of the present invention will be apparent from the following description, reference being had to the accompanying drawings, wherein a preferred form of the present invention is clearly shown.

In the drawings:

Figure 1 is a fragmentary perspective view, with parts broken away, showing somewhat schematically the general arrangement of the air conditioning equipment within the engine compartment of an automobile;

Figure 2 is a fragmentary perspective view, with parts broken away, showing somewhat schematically the means for distributing the conditioned air within the passenger compartment of the car;

Figure 3 is a fragmentary perspective view, with parts broken away, showing somewhat schematically the location of the air discharge ducts and some of the air outlets;

Figure 4 is a fragmentary vertical sectional view showing a preferred form of duct arrangement;

Figures 5, 6 and 7 are fragmentary vertical sectional views showing a modified form of an air outlet damper; and Figure 8 is a schematic circuit diagram showing the electric controls for the apparatus illustrated in Figs. 1 through 4.

Referring now to the drawing wherein a preferred embodiment of the invention has been shown, reference numeral 10 generally designates a passenger automobile having an engine compartment 12 and a passenger compartment 14. The usual engine 16 is provided in the engine compartment 12 for supplying power for propelling the automobile as well as for driving a refrigerant compressor 18 mounted in the engine compartment 12.

The air conditioning equipment used for cooling the passenger compartment of the car includes, in addition to the compressor 18, a condenser 20 mounted directly in front of the usual engine radiator 22, a receiver 24, a refrigerant evaporator 26 and the usual refrigerant flow connections including the suction line 27 and the liquid line 28 which serve to connect the evaporator, compressor, condenser and receiver 24 in series refrigerant flow relationship. The flow of refrigerant from the receiver 24 to the evaporator 26 is controlled by means of a conventional thermostatic expansion valve 30 having a bulb 32 arranged in thermal exchange relationship with the vaporized refrigerant leaving the evaporator through the suction line 27.

It will be noted that the evaportaor 26 is mounted in an insulated evaporator housing 36 which is adapted to be mounted on the usual firewall 38 which separates the engine compartment 12 from the passenger compartment 14. The housing 36 also serves to support an air heater coil 40 which is adapted to be connected to the main engine cooling system by means of the lines 42, in accordance with standard practice. The flow of water or other suitable liquid through the heater coil 40 is controlled by means of a thermostatically operated valve 44 which has its temperature sensing bulb 46 located so as to respond to the temperature of the air in the passenger compartment 14.

The compressor 18 is adapted to be driven by the main car engine 16 by means of a two-speed clutch and drive mechanism 50 of the type more fully shown and described in my copending application, Ser. No. 471,626, filed November 29, 1954. For a more complete description of this type of drive, reference is hereby made to said copending application.

As best shown in Fig. 4 of the drawing, a multiple speed fan 52 is provided, as shown, for circulating the air to be conditioned through the housing 36. Recirculated air is adapted to enter the air conditioning compartment through a return air grill 54 which, for purposes of illustration, has been shown located adjacent the front of the passenger compartment and beneath the instrument panel, as shown. A damper 56 is used for controlling the admission of recirculated air through the return air inlet 54.

Fresh air is adapted to be introduced through a fresh air inlet grill 60 located at the base of the windshield and communicating with an air duct 62 which leads to the inlet side of the evaporator, as shown. An automatically controlled fresh air damper 64 is provided in the duct 62 and serves to regulate the quantity of fresh air which is allowed to enter. The damper 64 is controlled by a bellows mechanism 66 which is connected to the refrigerant suction line 34 by means of a line 68, as shown in Fig. 4. The bellows mechanism 66 is adapted to close the damper 64 at high back pressures and to open the damper 64 at low back pressures. By virtue of the above-described arrangement, it is obvious that whenever the refrigerating system has excess refrigeration capacity, such as at high car speeds, the maximum amount of fresh air will be introduced into the evaporator inlet so as to increase the load on the evaporator and thereby help prevent the evaporator from operating at below freezing temperatures.

The outlet of the fan 52 leads to a plenum chamber 70 which extends substantially the full length of the instrument panel, as best shown in Fig. 3. A plurality of controlled air outlets 72 are provided for directing the air rearwardly from a point adjacent the upper edge of the instrument panel and fixed air outlets 110 direct a curtain of air along the side walls of the passenger compartment. The flow of air through the outlets 72 is controlled by manually operable dampers 74 located at the outlets 72. A portion of the conditioned air is directed from the ends of the plenum chamber 70 into ducts 76 which lead to air outlets 78 and 80 adjacent the floor of the front and rear passenger compartments, respectively, as best shown in Fig. 2. It will be noted that the air which discharges through the air outlets 80 is required to pass through air ducts 84 which are located in the doors of the car, as best shown in Fig. 2.

Since the air conditioner includes both the heating coil 40 as well as an evaporator coil 26, it is obvious that the apparatus can be used for maintaining the desired temperature conditions in the passenger compartment both during summertime and winter. When the apparatus is used for supplying heated air to the passenger compartment, the damper 74 can be closed, if desired, so as to cause most or all of the heated air to discharge through the outlets 78 and 80 which are located adjacent the floor of the passenger compartment and the outlets 110 at the sides of the passenger compartment.

During the winter season and occasionally at other times, it may be desirable to provide means for preventing the formation of frost on the outside surface or condensation on the inside surface of the windshield 92. As best shown in Fig. 4, the plenum chamber 70 is provided with an air outlet 86 which is located adjacent the base of the windshield so as to discharge a curtain of air onto the lower edge of the windshield. The flow of air through the outlet 86 is controlled by a butterfly damper 88 which is connected so as to operate in unison with a butterfly damper 90. The damper 90 serves to shut off the flow of air through the main outlet 72 when the damper 88 is moved to its fully open position. The air which discharges through the air outlet 86 will serve the purpose of defrosting the windshield 92 and prevent fogging of the inside surface of the windshield.

Figs. 5, 6 and 7 show a modified damper arrangement to be used in place of the dampers 72, 88 and 90, shown in Fig. 4, for controlling the discharge of air from the plenum chamber 70 into the space above the instrument panel. In the damper arrangement shown in Figs. 5 through 7, a rotatable cylindrical damper element 100 is mounted in each of the outlets in the upper wall of the plenum chamber and this damper is provided with an air inlet slot 102 in the one portion of its periphery and an air outlet slot 104 directly opposite the inlet slot 102. By rotating the cylindrical damper, it is possible to closely control the direction of the air leaving the outlet slot 104. With the damper 100 located in the position shown in Fig. 5, the conditioned air is discharged rearwardly away from the windshield whereas, when the damper is moved to the position in which it is shown in Fig. 6, the air is discharged more directly against the base of the windshield so as to serve to defog or defrost the windshield. The damper 100 can be set in any intermediate position whereby it is possible to control the direction in which the air is discharged into the passenger compartment. When it is desired to prevent any of the conditioned air from entering the passenger compartment adjacent the instrument panel, the damper is moved to the position in which it is shown in Fig. 7 with the result that none of the air is discharged into the upper portion of the passenger compartment and all of the air is required to flow through the fixed side outlets 110 which direct a curtain of air along the side windows of the car and the ducts 76 which lead to the floor air outlets 78 and 80.

As best shown in Fig. 3 of the drawing, a perforated shield 106 is mounted directly beneath the ceiling of the passenger compartment of the car so as to form with the ceiling of the passenger compartment an air distributing duct or plenum chamber from which the conditioned air discharges downwardly into the passenger compartment through the perforations 108. The forward edge of the shield 106 is spaced from the ceiling a greater distance than the main portion of the shield, as shown in Fig. 3, so as to provide a relatively wide inlet for the blast of conditioned air coming from the plenum chamber 70. By virtue of the above-described arrangement, the need for an air duct for connecting the outlet from air conditioning equipment mounted under the dashboard and the overhead air distributing plenum chamber, has been eliminated. The perforated shield 106 serves to uniformly distribute the conditioned air as it flows through the openings 108 into the passenger compartment without creating any objectionable drafts.

Referring now to Fig. 8 of the drawing, wherein the electrical controls have been shown, reference numeral 120 designates the usual car storage battery which is adapted to be charged by means of a conventional car generator (not shown), in accordance with standard practice. The flow of current from the battery to the air conditioning equipment is adapted to be controlled by means of a master switch 122 which may be operated in unison with the ignition switch (not shown), for example, so as to prevent operation of the air conditioning equipment when the car engine is not in operation. Reference numeral 124 designates a selector switch which is used for energizing the controls for either the heating equipment or the cooling equipment. In Fig. 8 of the drawing, this switch has been shown in the cooling position, but before the refrigeration equipment can be placed into operation it is also necessary to close the manual air conditioning switch 128.

Closing of the switches 122 and 124 places the air circulating fan 52 in operation at a speed determined by the setting of the fan speed control rheostat 130. The fan will continue to operate at its selected speed unless the air conditioning switch 128 has been closed in which case the solenoid 144 will be temporarily energized so as to shunt out the rheostat 130 by means of switch 146 so as to operate the fan at maximum speed when the air conditioner is first turned on. The fan will continue to operate at its maximum speed until the heating element 140 has served to heat the bimetallic thermostat 142 to a temperature high enough to interrupt the circuit to the solenoid 144. When the solenoid 144 becomes deenergized, the switch 146 operated thereby is opened with the result that all of the current flowing to the fan motor 52 is required to pass through the speed control rheostat 130, which would normally be set so as to cause the fan to operate at a reduced speed when refrigerated air is being discharged into the passenger compartment of the car. The thermostat 142 serves to cause the fan to operate at maximum speed for approximately five minutes or for a predetermined period of time substantially equal to the time required for the refrigerating apparatus to deliver real cold air into the passenger compartment. The operation of the compressor 18 is controlled by means of the two-speed drive mechanism 50 which includes a pair of speed selecting solenoids 150 and 152 which are controlled by means of a selector switch 154. This selector switch is operated by means of the actuator 156 which is preferably responsive to the outdoor air temperatures whereby at high outside air temperatures the compressor is driven at high speed, and at low outside air temperatures the compressor is driven at low speed. In the event that the temperature of the evaporator should fall below the temperature at which frost would form on the evaporator, a thermostat 158 has been provided as shown for deenergizing both the high and low speed coils 150 and 152 so as to stop operation of the compressor completely. This thermostat 158 is preferably located on the evaporator coil or one of its fins. A conventional mercury column type of thermostat 160 which responds to the passenger compartment air temperature controls the relay 162 so as to start and stop the compressor, in accordance with standard practice. The temperature at which the thermostat closes the circuit to the clutch control line 164 is controlled by changing the setting of the usual temperature control rheostat 166.

While the form of embodiment of the invention as herein disclosed constitutes a preferred form, it is to be understood that other forms might be adopted, as may come within the scope of the claims which follow.

What is claimed is as follows:

1. In an automobile air conditioning system, a compressor, a condenser, an evaporator, refrigerant flow means connecting said evaporator, compressor, and condenser in refrigerant flow relationship, variable speed blower means having an air inlet and an air outlet for circulating air to be conditioned in thermal exchange relationship with said evaporator, means for introducing fresh air to the air inlet of said blower means, means responsive to the refrigerant pressure in a portion of said refrigerant flow means for controlling the quantity of fresh air admitted to said inlet, and means responsive to initiation of operation of said compressor for energizing said blower means for maximum speed operation.

2. In an automobile air conditioning system, a compressor, a condenser, an evaporator, refrigerant flow means connecting said evaporator, compressor, and condenser in refrigerant flow relationship, blower means for circulating air to be conditioned in thermal exchange relationship with said evaporator, means for introducing fresh air to the intake side of said blower means, means responsive to the refrigerant pressure in a portion of said refrigerant flow means for controlling the quantity of fresh air admitted to said blower means, means for controlling the starting and stopping of said compressor, means for varying the speed of said blower means, and time delay means responsive to initiation of operation of said compressor for reducing the speed of said blower means a predetermined time interval after initiation of operation of said compressor.

3. In combination, an automobile having an engine compartment and a passenger compartment, an engine within said engine compartment, a compressor, a condenser, an evaporator, refrigerant flow connections between said compressor, condenser, and evaporator, torque transmitting means between said engine and said compressor, means including a variable speed blower for circulating air to be conditioned for said passenger compartment in thermal exchange relationship with said evaporator, means for initiating operation of said compressor and said blower, and means for reducing the speed of said blower means a predetermined time interval after initiation of said compressor.

4. In combination, an automobile having an engine compartment and a passenger compartment, an engine within said engine compartment, a compressor, a condenser, an evaporator, refrigerant flow connections between said compressor, condenser, and evaporator, torque transmitting means between said engine and said compressor, means including a variable speed blower for circulating air to be conditioned for said passenger compartment in thermal exchange relationship with said evaporator, means for initiating operation of said compressor and said blower, means for reducing the speed of said blower means a predetermined time interval after initiation of said compressor, said torque transmitting means including means for varying the speed ratio between said engine and said compressor, and means influenced by the outside air temperature for controlling said means for varying said speed ratio.

5. In an automobile air conditioning system, a compressor, a condenser, an evaporator, refrigerant flow connections between said compressor, condenser and evaporator, blower means for circulating air to be conditioned for the passenger compartment of an automobile in thermal exchange relationship with said evaporator, means for introducing outside air to the inlet of said blower means, means resposive to the refrigerant pressure at the outlet of said evaporator for regulating the quantity of fresh air admitted to said blower inlet, a variable speed engine, torque transmitting means between said engine and said compressor, said transmitting means including means for driving said compressor at either high or low speeds relative to said engine or for disconnecting said compressor from said engine, first means for selecting either said high or low relative speeds, and second means for independently controlling the disconnection of said compressor.

6. In combination, a vehicle having a passenger compartment provided with front and rear seats, a transparent windshield at the front of said passenger compartment, and an instrument panel at the base of said windshield adjacent the front of said vehicle, refrigerating apparatus including an air cooling coil for cooling said passenger compartment, fan means for circulating air to be conditioned in thermal exchange relationship with said coil, a plenum chamber beneath said instrument panel having air outlet means adjacent the base of said windshield, air deflector means for said outlet means mounted on said panel means for selectively directing air upwardly towards said windshield or towards occupants of said front seat, and a perforated air distributing shield disposed above said passenger compartment in spaced relationship to the top of said compartment and arranged to form with said top an open-ended plenum chamber disposed to receive conditioned air discharged upwardly adjacent said windshield.

7. In combination, a vehicle having a passenger compartment provided with front and rear seats, a transparent windshield at the front of said passenger compartment, and an instrument panel at the base of said windshield adjacent the front of said vehicle, refrigerating apparatus including an air cooling coil for cooling said passenger compartment, fan means for circulating air to be conditioned in thermal exchange relationship with said coil, a plenum chamber beneath said instrument panel having air outlet means adjacent the base of said windshield, air deflector means for said outlet means mounted on said panel means for selectively directing air upwardly towards said windshield or towards occupants of said front seat, and a perforated air distributing shield disposed above said passenger compartment in spaced relationship to the top of said compartment and arranged to form with said top an open-ended plenum chamber disposed to receive conditioned air discharged upwardly adjacent said windshield, said means for selectively directing the air comprising a pair of individually operable dampers.

8. In combination, a vehicle having a passenger compartment provided with front and rear seats, a transparent windshield at the front of said passenger compartment, and an instrument panel at the base of said windshield adjacent the front of said vehicle, refrigerating apparatus including an air cooling coil for cooling said passenger compartment, fan means for circulating air to be conditioned in thermal exchange relationship with said coil, a plenum chamber beneath said instrument panel having air outlet means adjacent the base of said windshield, air deflector means for said outlet means mounted on said panel means for selectively directing air upwardly towards said windshield or towards occupants of said front seat, and a perforated air distributing shield disposed above said passenger compartment in spaced relationship to the top of said compartment and arranged to form with said top an open-ended plenum chamber disposed to receive conditioned air discharged upwardly adjacent said windshield, said means for selectively directing the air comprising a single hollow rotatable cylinder having air inlet and outlet slots circumferentially spaced from one another.

9. In combination, a vehicle having a passenger compartment provided with front and rear seats, a transparent windshield at the front of said passenger compartment, and an instrument panel at the base of said windshield adjacent the front of said vehicle, refrigerating apparatus including an air cooling coil for cooling said passenger compartment, fan means for circulating air to be conditioned in thermal exchange relationship with said coil, a plenum chamber beneath said instrument panel having air outlet means adjacent the base of said windshield, air deflector means for said outlet means mounted on said panel means for selectively directing air upwardly towards said windshield or towards occupants of said front seat, and a perforated air distributing shield disposed above said passenger compartment in spaced relationship to the top of said compartment and arranged to form with said top an open-ended plenum chamber disposed to receive conditioned air discharged upwardly adjacent said windshield, and means for varying the speed of said fan means.

References Cited in the file of this patent

UNITED STATES PATENTS

| | | |
|---|---|---|
| 2,165,831 | Aulsebrook | July 11, 1939 |
| 2,172,944 | Norris | Sept. 12, 1939 |
| 2,264,821 | Zukoski | Dec. 2, 1941 |
| 2,264,848 | Kahl | Dec. 2, 1941 |
| 2,295,750 | Norris et al. | Sept. 15, 1942 |
| 2,304,642 | Hans | Dec. 8, 1942 |
| 2,321,242 | Ramsey | June 8, 1943 |
| 2,449,888 | Edwards | Sept. 21, 1948 |
| 2,752,759 | Sperzel | July 3, 1956 |
| 2,780,076 | McLean | Feb. 5, 1957 |
| 2,789,794 | Moore et al. | Apr. 23, 1957 |